(12) United States Patent
He et al.

(10) Patent No.: US 8,792,656 B2
(45) Date of Patent: Jul. 29, 2014

(54) ALL IN ONE COMPUTER

(75) Inventors: Feng-Long He, Shenzhen (CN);
Yong-Zhao Huang, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 305 days.

(21) Appl. No.: 13/188,076

(22) Filed: Jul. 21, 2011

(65) Prior Publication Data
US 2012/0281860 A1    Nov. 8, 2012

(30) Foreign Application Priority Data

May 5, 2011 (CN) .......................... 2011 1 0115467

(51) Int. Cl.
*H03G 3/00* (2006.01)
(52) U.S. Cl.
USPC ................................. 381/107; 381/58; 700/94
(58) Field of Classification Search
None
See application file for complete search history.

(56) References Cited

U.S. PATENT DOCUMENTS

| | | | | |
|---|---|---|---|---|
| 6,154,548 | A | * | 11/2000 | Bizzan .......................... 381/94.5 |
| 2006/0233383 | A1 | * | 10/2006 | Lee .................................. 381/58 |
| 2007/0286436 | A1 | * | 12/2007 | Isobe et al. .................... 381/107 |
| 2010/0205336 | A1 | * | 8/2010 | Kakish ............................. 710/73 |

* cited by examiner

*Primary Examiner* — Joseph Saunders, Jr.
*Assistant Examiner* — James Mooney
(74) *Attorney, Agent, or Firm* — Novak Druce Connolly Bove + Quigg LLP

(57) ABSTRACT

An all in one (AIO) computer implemented as a personal computer (PC) or a display includes a high definition multimedia interface, a speaker, and a speaker control circuit. The speaker control circuit includes an earphone interface circuit, a main controller, a signal processing unit, and a signal control circuit. The earphone interface circuit detects whether an earphone is inserted into the AIO computer. When the earphone interface circuit detects the earphone is connected to the AIO computer, if the AIO computer is implemented as the PC, the main controller sends a first muting signal. If the AIO computer is implemented as the display, the main controller sends a second muting signal, and the signal control circuit controls and mutes the speaker according to the first muting signal and the second muting signal.

20 Claims, 1 Drawing Sheet

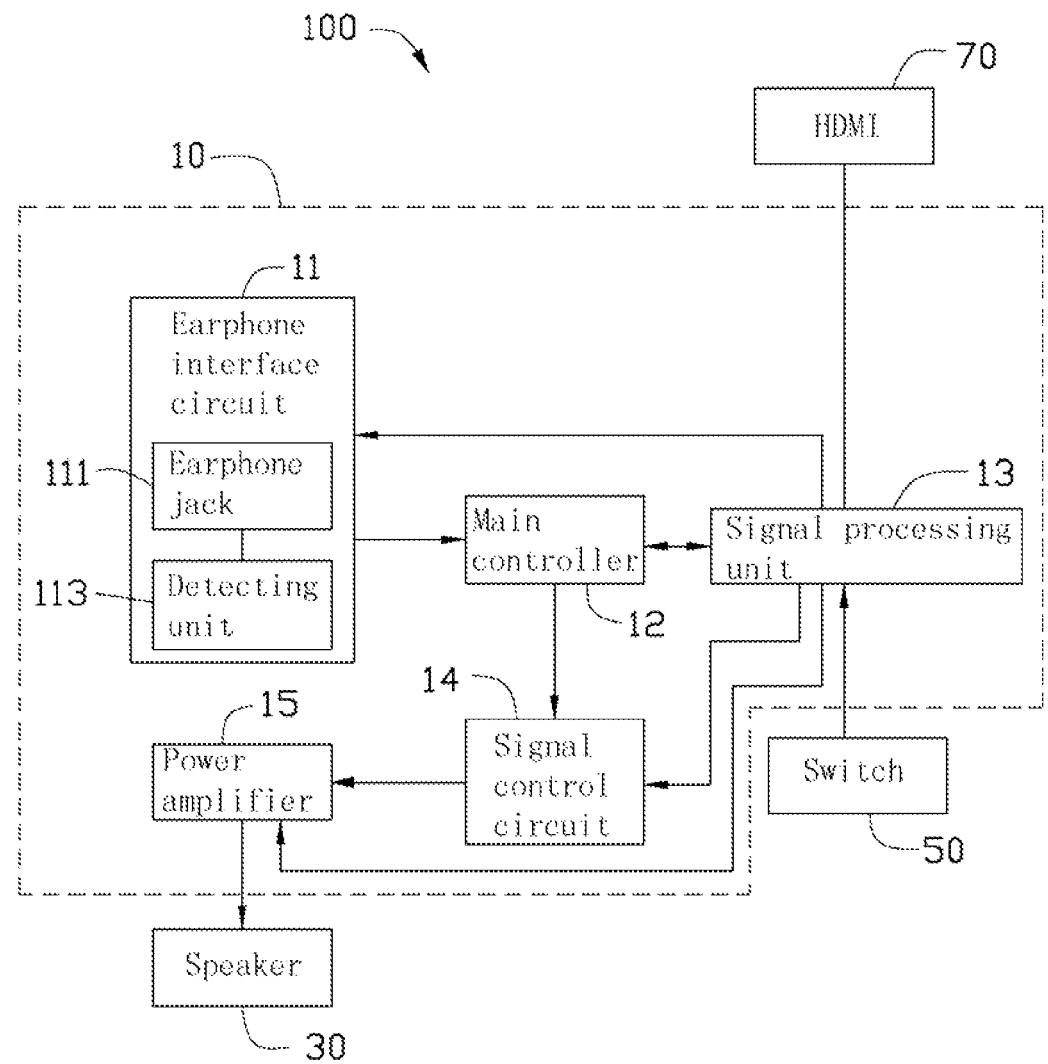

ALL IN ONE COMPUTER

BACKGROUND

1. Technical Field

The disclosure generally relates to computers, and more particularly relate to an all in one (AIO) computer with automatic mute for its speaker.

2. Description of the Related Art

Hosts are widely integrated within corresponding displays to form all in one (AIO) computers, thereby, the AIO computers can be implemented as personal computers, and further be implemented as high definition multimedia interface (HDMI) displays. Thus, if the AIO computer is used as a personal computer, when an earphone is inserted into the AIO speaker jack and electrically connects to the AIO computer, the built in speaker of the AIO computer will automatically stop outputting audio signals.

However, if the AIO computer is used as a HDMI display, because the audio signals that are displayed by the HDMI display are transmitted from other electronic devices, such as computers or Hosts, when the earphone is inserted into the AIO computer's speaker jack, the speaker of the AIO computer may continue to output audio signals.

Therefore, there is room for improvement within the art.

BRIEF DESCRIPTION OF THE DRAWINGS

Many aspects of an all in one computer can be better understood with reference to the following drawings. The components in the drawings are not necessarily drawn to scale, the emphasis instead being placed upon clearly illustrating the principles of the all in one computer. Moreover, in the drawings, like reference numerals designate corresponding parts throughout the several views. Wherever possible, the same reference numbers are used throughout the drawings to refer to the same or like elements of an embodiment.

The drawing is a block view of one embodiment of an all in one computer of the disclosure.

DETAILED DESCRIPTION

The drawing is a block view of one embodiment of an all in one (AIO) computer 100 of the disclosure. In this embodiment, the AIO computer 100 can integrate a host within a corresponding display. Thus, the AIO computer 100 can be implemented as a personal computer (PC), and further implemented as a High Definition Multimedia Interface (HDMI) display.

In this embodiment, when the AIO computer 100 is used as a PC, that is the AIO computer 100 works in a PC mode, the AIO computer 100 outputs and displays audio signals and video signals. When the AIO computer 100 is used as a HDMI display, that is, the AIO computer 100 works in a display mode, the AIO computer 100 is electrically connected to an external electronic device, such as a host, and receives and displays the audio and video signals from the external electronic devices.

The AIO computer 100 includes a speaker control circuit 10, a speaker 30, a switch 50, and a HDMI 70. In this embodiment, the speaker control circuit 10 is electrically connected to the speaker 30, the switch 50 and the HDMI 70. The speaker control circuit 10 includes an earphone interface circuit 11, a main controller 12, a signal processing unit 13, a signal control circuit 14, and a power amplifier 15.

In this embodiment, the earphone interface circuit 11 is electrically connected to the main controller 12, and includes an earphone jack 111 and a detecting unit 113. The earphone jack 111 is capable of receiving and connecting a corresponding earphone to output audio signals through the earphone. The detecting unit 113 is electrically connected to the earphone jack 111 and is capable of detecting whether the earphone is inserted into the earphone jack 111. For example, when the detecting unit 113 detects that the earphone is inserted into the earphone jack 111, the detecting unit 113 then sends a valid detection signal to the main controller 12. Otherwise, the detecting unit 113 sends an invalid detection signal to the main controller 12. In this embodiment, the detection signal is a high-active signal.

The main controller 12 is electrically connected to the signal processing unit 13 and the signal control circuit 14 to control the signal processing unit 13 and the signal control circuit 14. In this embodiment, when the AIO computer 100 works in the PC mode, if the main controller 12 receives the valid detection signal from the detecting unit 113, the main controller 12 sends a valid first muting signal to the signal control circuit 14. When the AIO computer 100 works in the display mode, if the main controller 12 receives the valid detection signal from the detecting unit 113, the main controller 12 then sends a valid command signal to the signal processing unit 13, making the signal processing unit 13 send a valid second muting signal to the signal control circuit 14. In this embodiment, the main controller 12 can be an embedded processor, the first muting signal and the second muting signal are low-active signals, and the command signal is a high-active signal.

The signal processing unit 13 electrically connects to the signal control circuit 14, the power amplifier 15 and the HDMI 70. When the AIO computer 100 works in the display mode, the AIO computer 100 is electrically connected to the external electronic device via the HDMI 70 to receive the audio and video signals. The signal processing unit 13 receives and processes the audio and video signals, and transmits the processed audio signal to the power amplifier 15 and the earphone interface circuit 11.

The signal processing unit 13 is further electrically connected to the switch 50. The switch 50 is capable of outputting and sending a switch signal to the signal processing unit 13 to switch and select operating modes (e.g., the PC mode or the display mode) of the AIO computer 100. For example, when the switch 50 outputs and sends a first switch signal (e.g., a high voltage signal) to the signal processing unit 13, the AIO computer 100 is switched to work in the display mode. Thus, the signal processing unit 13 receives the audio and video signals from the external electronic device via the HDMI 70, so the earphone interface circuit 11 and the power amplifier 15 then receive the audio signal of the external electronic device through the signal processing unit 13.

When the switch 50 outputs and sends a second switch signal (e.g., a low voltage signal) to the signal processing unit 13, the AIO computer 100 is switched to work in the PC mode, the signal processing unit 13 is disconnected from the external electronic device. Thus, the main controller 12 controls an audio microchip of the AIO computer 100 to provide and output audio signals to the earphone interface circuit 11 and the power amplifier 15.

The signal control circuit 14 is electrically connected to the power amplifier 15. When the signal control circuit 14 receives the first muting signal from the main controller 12 and/or the second muting signal from the signal processing unit 13, the signal control circuit 14 generates and outputs an enable signal to the power amplifier 15, enabling the power amplifier 15 to stop outputting the audio signal to the speaker 30. Thus, the audio signals from audio signal source (e.g., audio microchip) are diverted and output through the earphone.

In this embodiment, the signal control circuit 14 can be an AND gate circuit or a combinational logical circuit, allowing the enable signal from the signal control circuit 14 to be a low-active signal. Thus, either the main controller 12 or the signal processing unit 13 outputs a low muting signal, the signal control circuit 14 can output a low-active enable signal to the power amplifier 15. The power amplifier 15 is electrically connected to the speaker 30 and is capable of increasing and amplifying the power of the audio signals.

In use, when the detecting unit 113 fails to detect the earphone is inserted in the earphone jack 111, the main controller 12 and the signal processing unit 13 output and send high muting signals to the signal control circuit 14. Thus, the signal control circuit 14 outputs a high enable signal to the power amplifier 15, the audio signals are amplified by the power amplifier 15, and further are output and displayed by the speaker 30.

When the AIO computer 100 works in the PC mode and the earphone is inserted into the earphone jack 111. The detecting unit 113 sends a valid detection signal to the main controller 12, and the main controller 12 sends a valid first muting signal according to the detection signal to the signal control circuit 14. Thus, the signal control circuit 14 generates and outputs a low enable signal to the power amplifier 15, to control the power amplifier 15 to stop outputting audio signals to the speaker 30. Thus, the audio signals from audio signal source of the AIO computer 100 are diverted and output to the earphone.

When the AIO computer 100 works in the display mode and connects to an external electronic device via the HDMI 70 to receive the audio and video signals. The earphone is inserted into the earphone jack 111, the detecting unit 113 sends a valid detection signal to the main controller 12, and the main controller 12 sends a valid command signal to the signal processing unit 13 according to the detection signal. The signal processing unit 13 sends a valid second muting signal according to the command signal to the signal control circuit 14. Thus, the signal control circuit 14 generates and outputs a low enable signal to the power amplifier 15, to further control the power amplifier 15 to stop outputting audio signals to the speaker 30. Thus, the main controller 12 controls the audio signals from the external electronic device to be diverted and output to the earphone through the signal processing unit 13 and the earphone jack 111.

Moreover, when the AIO computer 100 works in the display mode, if the main controller 12 receives the detection signal from the detecting unit 113, the main controller 12 can directly send a muting signal to the signal control circuit 14 to control the power amplifier 15 to stop outputting audio signals. Thus, the signal control circuit 14 is muted.

In summary, in the AIO computer 100 of the embodiment of this disclosure, the AIO computer 100 can be implemented as a PC and be further implemented as a display. When an earphone is inserted into the AIO computer, whether the AIO computer 100 works in the PC mode or the display mode, the main controller 12 can control and mute the speaker 30.

In the present specification and claims the word "a" or "an" preceding an element does not exclude the presence of a plurality of such elements. Further, the word "comprising" does not exclude the presence of other elements or steps than those listed.

It is to be understood, however, that even though numerous characteristics and advantages of the disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An all in one (AIO) computer implemented as a personal computer (PC) or a display, the AIO computer comprising:
   a high definition multimedia interface (HDMI) electrically connected to an external electronic device;
   a speaker for outputting audio signals; and
   a speaker control circuit electrically connected to the HDMI and the speaker, the speaker control circuit comprising:
   an earphone interface circuit for detecting whether an earphone is inserted and is connected to the AIO computer;
   a main controller electrically connected to the earphone interface circuit;
   a signal processing unit electrically connected to the HDMI, the main controller and the earphone interface circuit, the signal processing unit for processing the audio signals; and
   a signal control circuit electrically connected to the signal processing unit and the main controller, wherein when the AIO computer is implemented as the PC, and the earphone interface circuit detects the earphone is connected to the AIO computer, the main controller provides and sends a first muting signal; when the AIO computer is implemented as the display, the earphone interface circuit detects the earphone is inserted into the AIO computer, the main controller sends a command signal to the signal processing unit, and the signal processing unit sends a second muting signal under a control of the main controller, and the signal control circuit controls and mutes the speaker according to the first muting signal and the second muting signal.

2. The AIO computer as claimed in claim 1, wherein the earphone interface circuit comprises an earphone jack and a detecting unit, the earphone jack is capable of receiving and connecting the earphone, and outputting audio signals to the earphone, and the detecting unit is electrically connected to the earphone jack and is capable of detecting whether the earphone is inserted into the earphone jack.

3. The AIO computer as claimed in claim 2, wherein when the detecting unit detects that the earphone is inserted into the earphone jack, the detecting unit sends a detection signal to the main controller, if the AIO computer is implemented as the PC, the main controller sends the first muting signal to the signal control circuit; if the AIO computer is implemented as the display, the main controller sends the command signal to the signal processing unit, and the signal processing unit sends the second muting signal to the signal control circuit.

4. The AIO computer as claimed in claim 3, wherein the main controller is an embedded processor, the first muting signal and the second muting signal are low-active signals, and the command signal is a high-active signal.

5. The AIO computer as claimed in claim 3, wherein the speaker control circuit further comprises a power amplifier electrically connected to the speaker and the signal control circuit, the power amplifier is capable of increasing and amplifying the power of the audio signals and outputting the amplified audio signals to the speaker.

6. The AIO computer as claimed in claim 5, wherein when the AIO computer is implemented as the display, the AIO computer is electrically connected to the external electronic device via the HDMI to receive the audio signals, and the signal processing unit receives and processes the audio signals, and transmits the processed audio signal to the power amplifier and the earphone interface circuit.

7. The AIO computer as claimed in claim 6, further comprising a switch electrically connected to the signal processing unit, wherein the switch is capable of outputting and sending a switch signal to the signal processing unit to switch and select the operating mode of the AIO computer, when the switch outputs and sends a first switch signal to the signal processing unit, the AIO computer works as the display, the signal processing unit receives the audio signals from the electronic device through the HDMI, and the earphone interface circuit and the power amplifier receive the audio signal of the external electronic device through the signal processing unit.

8. The AIO computer as claimed in claim 7, wherein when the switch outputs and sends a second switch signal to the signal processing unit, the AIO computer is implemented as the PC, the signal processing unit is disconnected from the external electronic device, and the main controller provides the audio signals for the earphone interface circuit and the power amplifier.

9. The AIO computer as claimed in claim 7, wherein when the signal control circuit receives the first muting signal from the main controller and/or the second muting signal from the signal processing unit, the signal control circuit generates and outputs an enable signal to the power amplifier to enable the power amplifier to stop outputting the audio signal to the speaker, and the audio signals are diverted to the earphone.

10. The AIO computer as claimed in claim 9, wherein the signal control circuit is an AND gate circuit or a combinational logical circuit, the enable signal from the signal control circuit is a low-active signal, and either the signal processing unit 13 or the main controller outputs a low muting signal, the signal control circuit 14 can output a low-active enable signal to the power amplifier.

11. An all in one (AIO) computer implemented as a personal computer (PC) or a display, the AIO computer comprising:
a high definition multimedia interface (HDMI) electrically connected to an external electronic device to receive audio signals;
a speaker for displaying audio signals;
an earphone interface circuit comprising a detecting unit, the detecting unit sending a detection signal according to a detection that an earphone connects to the AIO computer;
a main controller electrically connected to the earphone interface circuit;
a signal processing unit electrically connected to the HDMI, the main controller and the earphone interface circuit, the signal processing unit for processing the audio signals;
a signal control circuit electrically connected the signal processing unit and the main controller; and
a power amplifier electrically connected to the signal control circuit and the speaker, wherein the AIO computer works in a personal computer (PC) mode or a display mode, when the detecting unit detects the earphone is connected to the AIO computer and sends the detection signal, if the AIO computer works in the PC mode, the main controller outputs a first muting signal; if the AIO computer works in the display mode, the main controller outputs a command signal to the signal processing unit, and the signal processing unit sends a second muting signal under a control of the main controller, and the signal control circuit controls the power amplifier to stop outputting audio signals and mute the speaker according to the first muting signal and the second muting signal.

12. The AIO computer as claimed in claim 11, wherein the earphone interface circuit comprises an earphone jack electrically connected to detecting unit, the earphone jack is capable of receiving and connecting the earphone, and outputting audio signals to the earphone, and the detecting unit is capable of detecting whether the earphone is inserted into the earphone jack.

13. The AIO computer as claimed in claim 12, wherein when the detecting unit detects that the earphone is inserted into the earphone jack, the detecting unit sends a detection signal to the main controller, if the AIO computer works in the PC mode, the main controller sends the first muting signal to the signal control circuit; if the AIO computer works in the display mode, the main controller sends the command signal to the signal processing unit, and the signal processing unit sends the second muting signal to the signal control circuit.

14. The AIO computer as claimed in claim 13, wherein the main controller is an embedded processor, the first muting signal and the second muting signal are low-active signals, and the command signal is a high-active signal.

15. The AIO computer as claimed in claim 13, wherein the power amplifier is capable of increasing and amplifying the power of the audio signals and outputting the amplified audio signals to the speaker.

16. The AIO computer as claimed in claim 15, wherein when the AIO computer works in display mode, the AIO computer is electrically connected to the external electronic device via the HDMI to receive the audio signals, and the signal processing unit receives and processes the audio signals, and transmits the processed audio signal to the power amplifier and the earphone interface circuit.

17. The AIO computer as claimed in claim 16, further comprising a switch electrically connected to the signal processing unit, wherein the switch is capable of outputting and sending a switch signal to the signal processing unit to switch and select the operating mode of the AIO computer, when the switch outputs and sends a first switch signal to the signal processing unit, and the AIO computer works in the display mode, the signal processing unit receives the audio signals from the electronic device through the HDMI, and the earphone interface circuit and the power amplifier receive the audio signal of the external electronic device through the signal processing unit.

18. The AIO computer as claimed in claim 17, wherein when the switch outputs and sends a second switch signal to the signal processing unit, the AIO computer is switched to work in the PC mode, the signal processing unit is disconnected from the external electronic device, and the main controller provides the audio signals for the earphone interface circuit and the power amplifier.

19. The AIO computer as claimed in claim 17, wherein when the signal control circuit receives the first muting signal from the main controller and/or the second muting signal from the signal processing unit, the signal control circuit generates and outputs an enable signal to the power amplifier to enable the power amplifier to stop outputting the audio signal to the speaker, and the audio signal is output through the earphone.

20. The AIO computer as claimed in claim 19, wherein the signal control circuit is an AND gate circuit or a combinational logical circuit, the enable signal from the signal control circuit is a low-active signal, and either the signal processing unit or the main controller outputs a low muting signal, the signal control circuit outputs a low-active enable signal to the power amplifier.

* * * * *